Nov. 28, 1933. P. T. CHAMPLIN 1,937,424
KNIFE RACK
Filed July 14, 1932
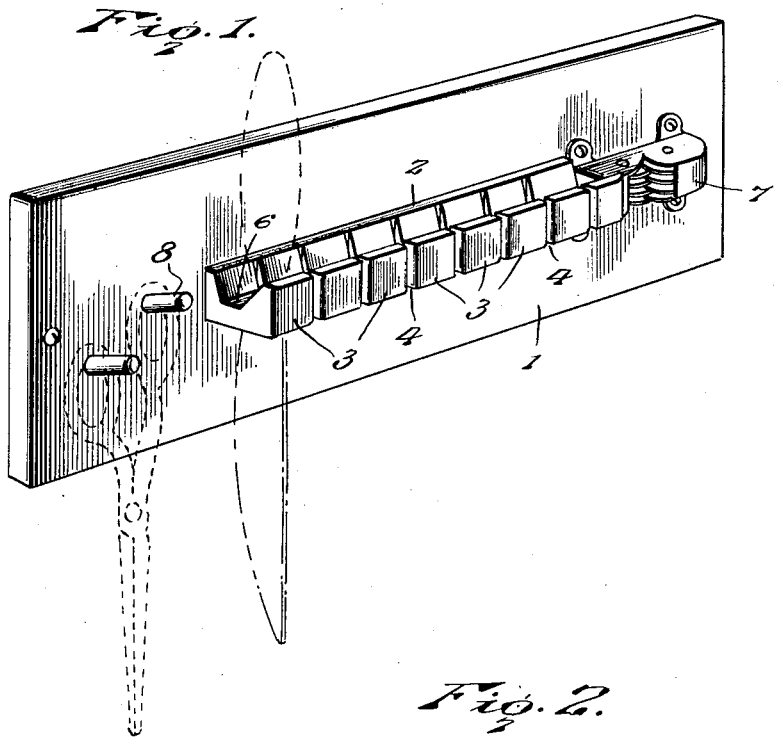
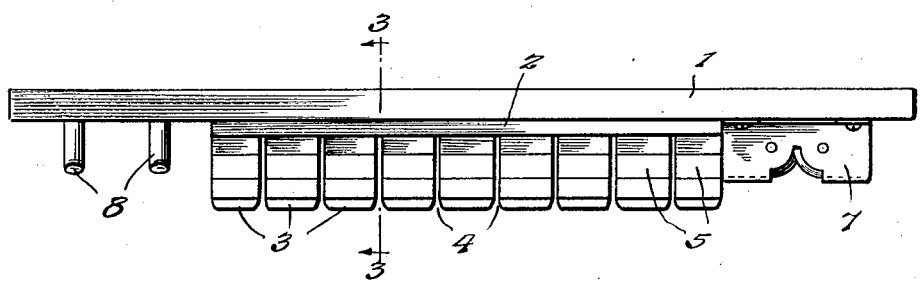
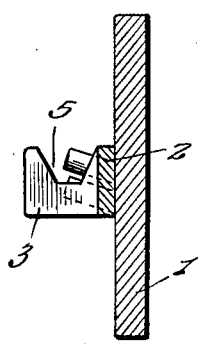
Inventor
P. T. Champlin.
By Lacey & Lacey,
Attorneys Patented Nov. 28, 1933

1,937,424

UNITED STATES PATENT OFFICE 1,937,424

KNIFE RACK

Philip T. Champlin, Little Valley, N. Y.

Application July 14, 1932. Serial No. 622,526

3 Claims. (Cl. 211—87)

The object of this invention is to provide a very simple and inexpensive device whereby knives may be supported in a convenient position where they may be easily removed when desired for use and will be open to inspection so that the desired knife may be easily selected. The device is intended more particularly for use in kitchens where a variety of knives are generally desired for different uses but in the absence of some convenient means for maintaining them in proper position the process of selecting a knife from an assortment of knives is more or less difficult. The invention is illustrated in the accompanying drawing and will be hereinafter fully described and set forth.

In the drawing, Fig. 1 is a perspective view of a knife rack embodying the present invention, Fig. 2 is a top plan view of the same, Fig. 3 is a transverse section on the line 3—3 of Fig. 2.

In carrying out the invention, there is provided a base board 1 of convenient size and form which may be secured against a wall or other fixed support. In the accompanying drawing, this board is shown as being of an oblong form and along the medial horizontal line thereof there is secured in any preferred or convenient manner a holder consisting of a block 2 from which projects a series of lugs 3 which are integral with the block 2 and may be easily formed by sawing kerfs 4 into the block from the outer edge of the same, as will be understood. It will thus be seen that the lugs are separated by slight spaces which will be of such width as to accommodate a knife blade but too narrow to permit a knife handle to pass downwardly therethrough. In the upper surface of each block is a recess or channel 5, the series of recesses constituting a trough extending from end to end of the base block 2. This trough or series of recesses will accommodate an end of the handle so that the knives will be firmly supported and will be held against rocking and, therefore, will not be apt to inflict injury upon persons working near or passing the rack. The kerfs 4 extend entirely through the front edge and bottom of the holder and intersect the channel or trough but terminate short of the rear edge of said holder so that the lugs 3 formed by the kerfs project laterally from the holder and constitute an integral part thereof, as best shown in Fig. 3 of the drawing. It will be noted that the side walls of the trough or channel converge downwardly while the bottom of the trough is disposed in a horizontal plane so as to accommodate handles of different sizes. The knives should preferably be inserted in the rack with their cutting edges presented to the wall or the base 1, as indicated by the dotted lines in Fig. 1. By the use of the device, a plurality of knives may be supported in such position that they will all be open to immediate inspection and any desired knife may be withdrawn at once whenever its use is needed.

To increase the usefulness of the rack, a knife sharpener 7 is provided at one end of the holding rack, and, adjacent the opposite end, pegs 8 are secured in and project forwardly from the base 1 and provide a very convenient means for suspending a pair of shears.

This device is exceedingly simple and inexpensive and its many advantages are thought to be evident.

Having thus described the invention, I claim:

1. A knife rack comprising a support, an elongated holder secured to one side of the support and having its upper face formed with a continuous longitudinal channel the side walls of which converge downwardly, there being spaced kerfs formed in the front edge and bottom of said holder and intersecting the converging side walls of the channel but terminating short of the rear edge of said holder whereby a knife blade may be inserted in a selected kerf with the handle thereof disposed within the channel and supported thereby.

2. A knife rack comprising a support, a solid longitudinal block secured to one side of the support and having a substantially V-shaped channel formed in the upper face thereof co-extensive with the length of the block and opening through the opposite ends thereof, there being spaced vertical kerfs formed in the front edge and bottom of the block and extending transversely thereof and intersecting the walls of the channel but terminating short of the rear edge of the block whereby the blade of a knife may be inserted in a selected kerf with the handle of the knife disposed within the channel and supported by the walls thereof at opposite sides of the adjacent kerf.

3. A knife rack comprising an elongated holder for attachment to a support and having its upper face provided with a continuous substantially V-shaped channel opening through the opposite ends thereof, there being vertical kerfs formed in the front edge and bottom of the holder and intersecting the channel but terminating short of the rear edge of the holder whereby a knife blade may be inserted in a selected kerf with the handle thereof disposed within the channel and supported thereby.

PHILIP T. CHAMPLIN.